United States Patent

Mazza et al.

Patent Number: 6,075,338
Date of Patent: Jun. 13, 2000

[54] DRIVING OF A THREE-PHASE MOTOR WITH FUZZY LOGIC CONTROL OF THE SLIP

[75] Inventors: Ettore Mazza, Palermo; Biagio Russo, Mascalucia; Biagio Giacalone, Trapani, all of Italy; Jean-Marie Bourgeois, Divonne les Baines, France

[73] Assignee: SGS-Thomson Microelectronics S.r.l., Agrate Brianza, Italy

[21] Appl. No.: 09/003,206

[22] Filed: Jan. 6, 1998

[30] Foreign Application Priority Data

Aug. 6, 1997 [IT] Italy .................................. VA97A0001

[51] Int. Cl.$^7$ ...................................... H02P 5/34
[52] U.S. Cl. ........................... 318/803; 318/807; 318/811; 395/900; 701/57
[58] Field of Search ..................................... 318/560–696, 318/799, 811, 800–809; 395/3, 13, 900, 61, 81, 1, 51; 365/148–153, 163, 176, 426.03, 426.01; 701/57

[56] References Cited

U.S. PATENT DOCUMENTS

| | | | |
|---|---|---|---|
| 5,272,428 | 12/1993 | Spiegel et al. | 318/803 |
| 5,424,948 | 6/1995 | Jordan, Jr. | 364/426.03 |
| 5,481,648 | 1/1996 | Volponi et al. | 395/51 |
| 5,497,063 | 3/1996 | Day et al. | 318/610 |
| 5,652,485 | 7/1997 | Spiegel et al. | 318/147 |
| 5,663,626 | 9/1997 | D'Angelo et al. | 318/799 |
| 5,745,361 | 4/1998 | Kim et al. | 364/148 |
| 5,774,630 | 6/1998 | Lee et al. | 395/13 |

*Primary Examiner*—Paul Ip
*Attorney, Agent, or Firm*—Theodore E. Galanthay; Allen, Dyer, Doppelt, Milbrath & Gilchrist, P.A.

[57] ABSTRACT

Driving of a three-phase motor includes controlling the slip of the motor by way of a fuzzy logic algorithm. The simplicity and precision of the fuzzy control of the slip permits dynamically optimizing the efficiency of a three-phase motor under any operating condition, and thereby minimizing power consumption. The control is carried out by knowing: the effective speed of the motor that represents the feedback value, and that may be provided by a common encoder (typically a dynamo or an optic device) keyed on the motor's spindled; the stator frequency imposed on the motor; the required speed; and, of course, the characteristic curve (frequency-torque) of the motor.

27 Claims, 4 Drawing Sheets

DRIVING OF A THREE-PHASE MOTOR WITH FUZZY LOGIC CONTROL OF THE SLIP

FIELD OF THE INVENTION

The present invention relates to three-phase motors, and, more particularly, to control systems for such motors.

BACKGROUND OF THE INVENTION

Nowadays, thanks to the technological developments in the field, it is becoming more convenient in many applications, such as also in the "consumer" sector, to use a three-phase motor in place of the more traditional, so-called universal motor. In particular, the use of three-phase motors is rapidly spreading to domestic appliances. The typical characteristic curve of a three-phase motor is shown in FIG. 1, while the characteristic curve that could be obtained by exerting a correct control of the operating conditions is shown in FIG. 2.

As it may be observed, a generic three-phase motor has a high torque at start-up, a low torque at high speeds, a high slip and a relatively low efficiency. In contrast, an equivalent motor when electronically controlled has a reduced slip, a high efficiency and can provide for a high torque also at high speeds.

To implement an accurate control of a three-phase motor, beside controlling the stator frequency, it is also necessary to implement an effective control of the slip, which represents the difference between the frequency of the stator and the frequency of the rotor (which corresponds to the motor rotation speed). This control is essential if the motor is to be employed to the limits of its capabilities, that is, to the maximum of its performances. Indeed, under extreme conditions a precisely controlled functioning is very important. To optimize efficiency, it is necessary that the operating point of the motor be precisely controlled. A slip too small, as well as a slip too large, may cause a decrease of the efficiency and make attaining top performances very difficult.

Slip is commonly controlled by the use of a microprocessor storing in a look-up table a series of permitted slip values (usually expressed in percentages of the stator frequency). Unfortunately, using a look-up table, that is, a set of pre-defined regulation values, is limiting because it does not allow for a dynamic self-adapting control upon changing conditions of operation of the motor.

SUMMARY OF THE INVENTION

In view of the foregoing background, it is therefore an object of the invention to provide a control system for a three-phase motor that is more efficient than known systems, with the ability of self-adapting to changing operating conditions of the motor to ensure an optimal control. This is achieved by controlling the slip of the motor by way of a fuzzy logic algorithm in accordance with the present invention.

It has been found that the simplicity and precision of a fuzzy control of the slip permits dynamically optimizing the efficiency of a three-phase motor under any operating condition, and thereby minimizing power consumption. Moreover, by minimizing the power consumption, it is possible to reduce the size of the power stages and the cost of the whole motor-drive system. The use of a programmable control device permits a great flexibility of the device that may be easily adapted to any modification of the components of the system or of a crucial parameter of the system.

The control is carried out by knowing: a) the effective speed of the motor that represents the feedback value, and that may be provided by a common encoder (typically a dynamo or an optic device) keyed on the motor's spindled; b) the stator frequency imposed on the motor; c) the required speed; and d) of course, the characteristic curve (frequency-torque) of the motor.

The slip is measured by the microprocessor according to the following formula:

$$S = \frac{f_s - f_r}{f_s}$$

It may take both positive and negative values and is converted into a word or digital datum, codified for example with 7 bits plus an eighth sign-bit that is compressed to a range: −127 and +128. This constitutes the starting datum from which a pulse width modulation (PWM) index and the base frequency of the driving signals of the respective phase windings of the motor (that is the stator frequency and the PWM modulation to be applied to the motor, depending on the load and the required speed) are calculated. The fuzzy logic control of the slip is implemented according to fuzzy rules that will be illustrated later to define only a minimum and a maximum limit of the PWM modulation index.

During the running of the motor, the slip assumes through successive corrections, the least value that maintains the desired operating point. The limit values (max. and min.) may be determined either heuristically or by a complete characterization of the motor's electrical parameters.

An important advantage of the fuzzy logic control system of the invention is that of determining automatically the optimal value of the PWM modulation index, without unduly delivering surplus power to the motor and without the risk of failing to maintain the set reference speed.

The functioning of the control system of the invention may be summarized as follows: once the load is assessed and the maximum slip value permitted is fixed, when the error in terms of speed becomes large, a larger torque is needed, which may be obtained by incrementing the PWM index and, eventually, also the stator frequency to modify the operating point to make available the maximum torque, at all times. The increment of the stator frequency is limited by the accepted maximum slip that under no circumstances can be exceeded. As a matter of fact, an excessive increment of the stator frequency with respect to that of the rotor would cause a large slip and, therefore, decrease the torque that may be supplied by the motor and thereby diminish the efficiency.

According to the present invention, the problem of slip control is addressed based on the use of a fuzzy logic microcontroller which estimates the maximum slip allowed at a certain speed and the modulation index that is necessary to maintain an optimal operating point.

According to an embodiment of the invention, the driving system of a three-phase motor comprises a generator of PWM drive signals of a certain base frequency (or stator frequency) mutually out of phase by 120° as a function of digital control data, respectively of the frequency and of the PWM modulation index, input to the PWM generator. A first digital comparator compares a first datum representative of the rotation speed of the motor with a second datum that sets the desired speed and outputs a third or error datum. Dedicated means generate the first datum as a function of the motor's rotation speed. A second digital comparator compares the first datum with a preset value of the base frequency and produces a fourth datum that represents the slip. A fuzzy logic controller processes according to a fuzzy algorithm the third digital datum (error), the fourth datum (slip) and the first datum (speed of the motor) and outputs a fifth datum of adjustment of the base frequency and a sixth datum of adjustment of the PWM modulation index.

According to an embodiment with an incremental type of control, the system may also include a register, updatable by the microprocessor, capable of containing the fifth adjustment datum of the base frequency. The system may also include an adder/subtractor-therefor circuit having first inputs through which the fifth datum is fed in the form of a correction value produced by the fuzzy logic microprocessor, as an alternative to presetting a certain value of base frequency, and second inputs through which is fed the value of the base frequency stored in the register and output nodes onto which is produced a regulated value of the frequency fed to the PWM generator and which is recorded in the register as the updated datum of the base frequency. In this way, the number of coding bits of the adjustment datum produced by the microprocessor is freed from the actual level of definition (for example with words of 16 bits) of the base frequency.

BRIEF DESCRIPTION OF THE DRAWINGS

The different aspects and advantages of the invention will become even more evident through the description of an important embodiment and by referring to the annexed drawings, wherein.

DETAILED DESCRIPTION OF THE PREFERRED EMBODIMENTS

Figure 1:
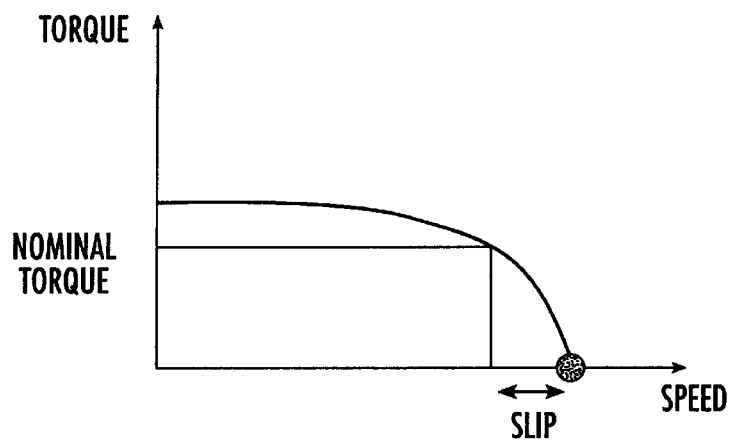
FIG. 1 shows a typical torque-speed characteristic curve of a three-phase motor as in the prior art.
Figure 2:
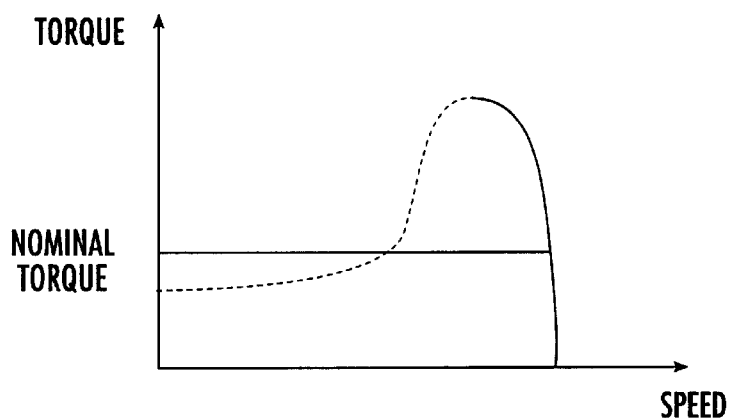
FIG. 2 shows the characteristic curve of an electronically controlled three-phase motor as in the prior art.
Figure 3:
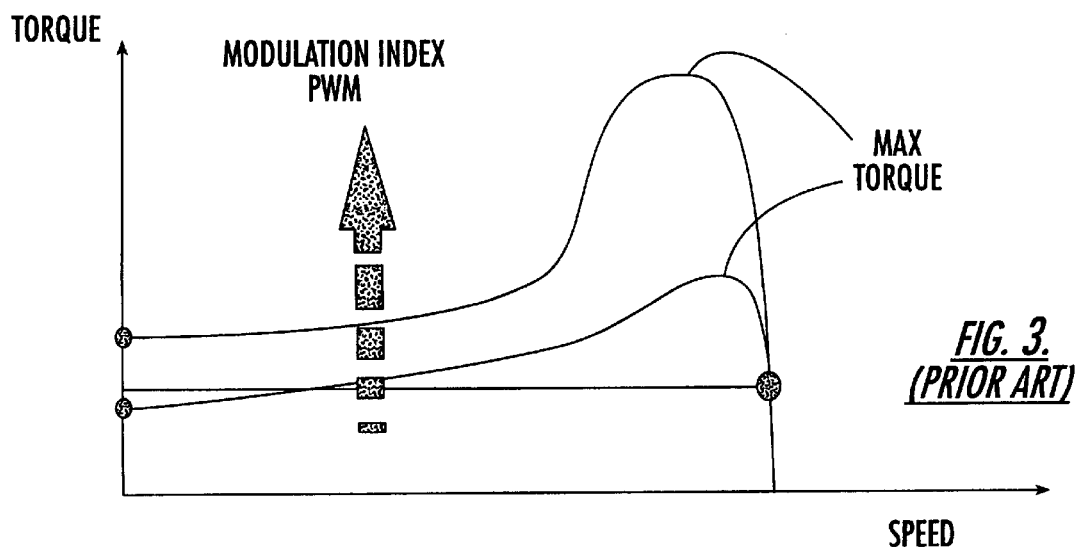
FIG. 3 is a diagram showing the effect of increasing the PWM modulation index on the torque-speed characteristic of the motor as in the prior art.

By referring to a typical characteristic curve of an electronically driven motor, as already described in relation to FIG. 2, the effect of increasing the PWM modulation index is illustrated in FIG. 3. The other driving control parameter is represented by the base frequency or stator frequency which, compatibly to the maximum permitted slip at a certain speed, alters the operating point of the motor.

Figure 4:
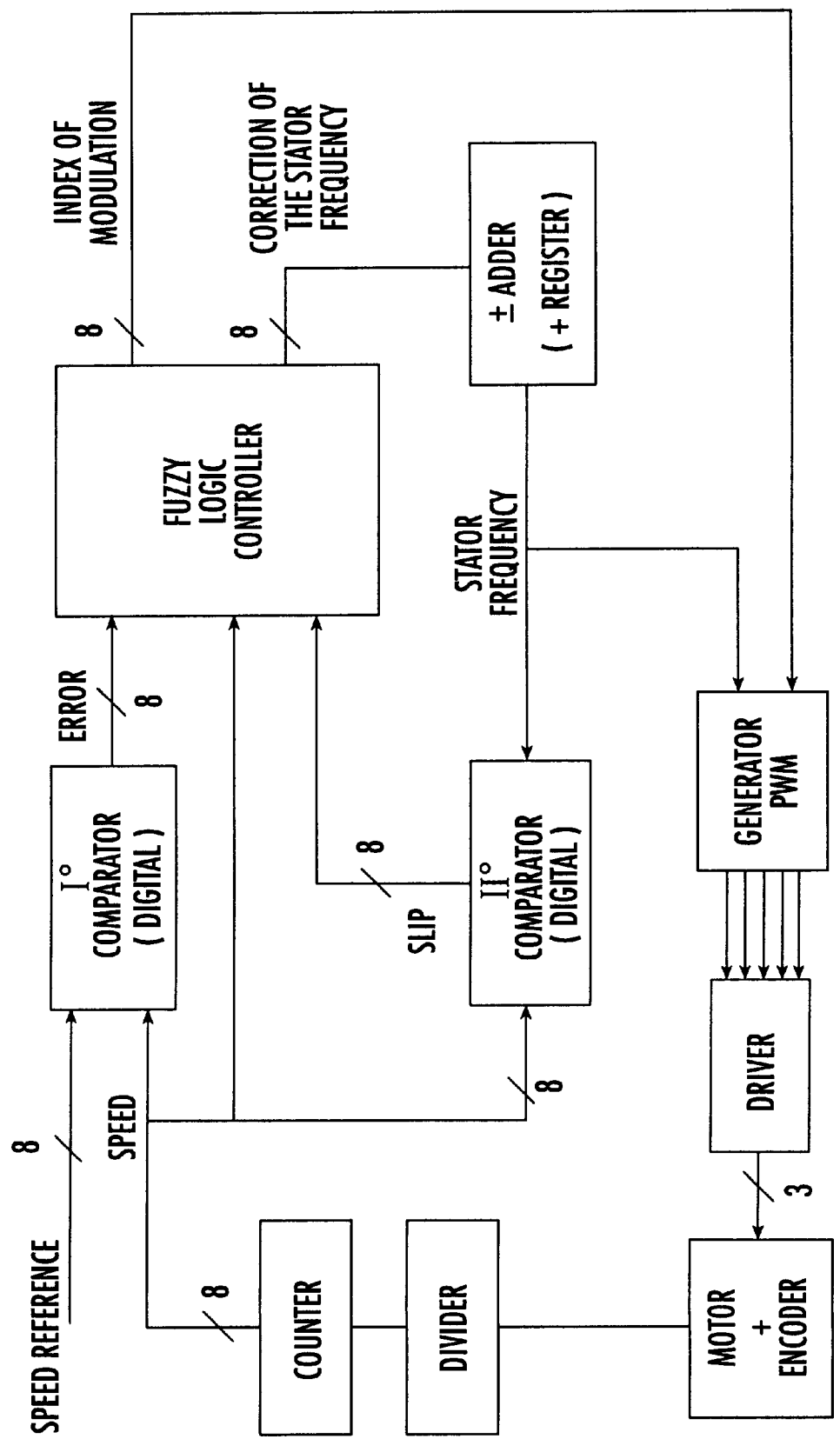
FIG. 4 is a block diagram of the fuzzy logic control system of a three-phase motor, according to an embodiment of the present invention.
Figure 5:
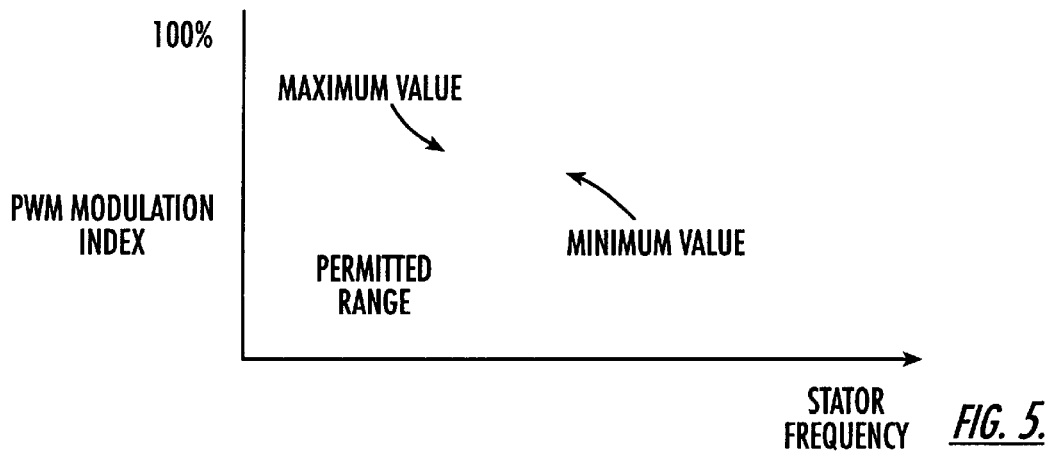
FIG. 5 show a functioning scheme of the fuzzy logic control system of the invention.
Figure 6A:
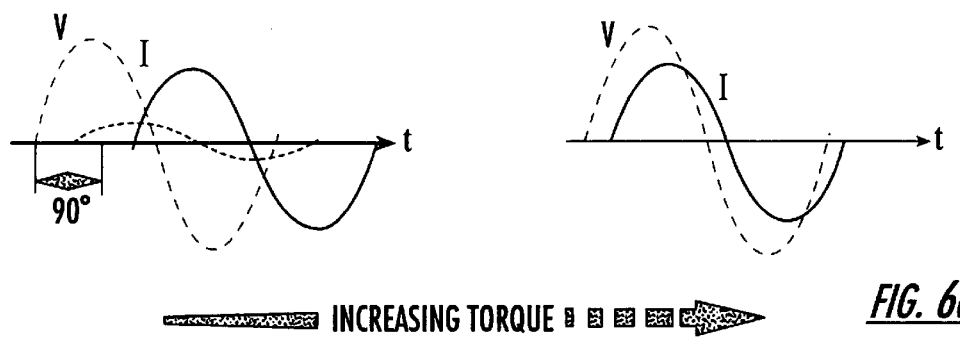
FIGS. 6a and 6b compare the functioning differences of a motor-system with a known type of control and with a fuzzy logic control, according to the present invention.
Figure 6B:
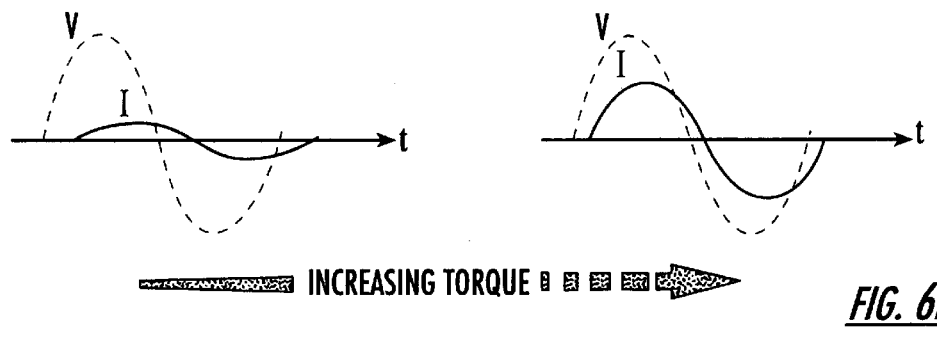

A basic diagram of a fuzzy logic control system of a three-phase motor according to the present invention is depicted in FIG. 4. The essential aspects that characterize the system of the invention are the use of a fuzzy logic controller and, according to the embodiment described, of an adder and of an updatable register (correction) of the stator phase-switching frequency that is imposed to the PWM generator, and of a comparator of the imposed stator frequency and of the rotor's speed supplying to the fuzzy controller a datum representing the slip.

According to a preferred embodiment of the invention, the number of pulses per revolution generated by the encoder, keyed on the axle of the motor, is divided by a dedicated divider stage, preferably equipped by a Schmidt trigger input circuit. The divider stage, properly programmed according to the characteristics of the motor and of the dynamo (encoder), provides for the same digital value for identical frequency values of the rotor by taking into account the ratio between the number of poles of the encoder and that of the particular motor.

In cascade to the divider, there is a counter that provides to the digital control system a datum representative of the rotor's speed, which may be codified, for example, in bytes of eight bits (seven bits plus a sign bit). A first digital comparator produces the difference between the two digital values, that is, between the reference and the real speed of the motor in the form of a digital error datum which, in the illustrated example, is also encoded in words of eight bits (seven bits and a sign bit).

A second digital comparator produces the difference between the datum that represents the motor speed, that is, the rotor frequency, with the datum that represents the stator frequency, that is, the base frequency that is fed to the PWM drive circuit. The second comparator outputs a datum representative of the slip value which is input together with the speed error datum and with the instantaneous speed datum to the fuzzy logic controller.

In case of an incremental control, the fuzzy logic controller calculates the needed correction of the stator frequency, otherwise it calculates the new value (already updated) of stator frequency and an appropriate PWM modulation index, as well as the maximum permitted slip at the current speed of the motor. In the illustrated example of an incremental control system, an adder is used to update the value of the new stator frequency to be imposed onto the PWM generator in conjunction with the correct modulation value.

Figure 8:
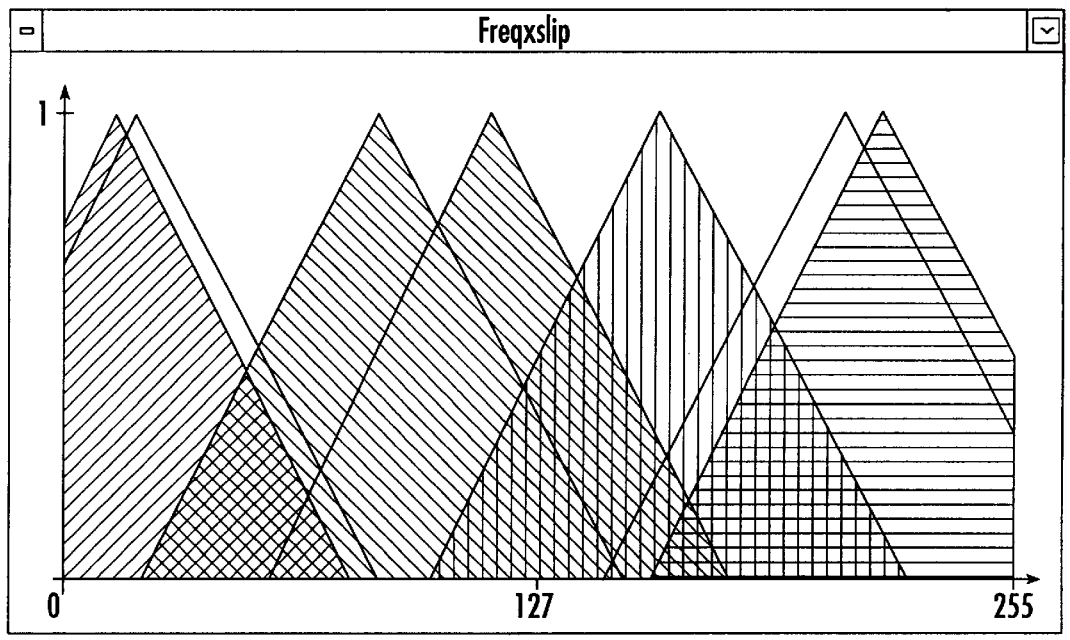
FIG. 8 shows the diagrams of the membership functions of the "input speed" variable of the motor in a system of the invention.
Figure 9:
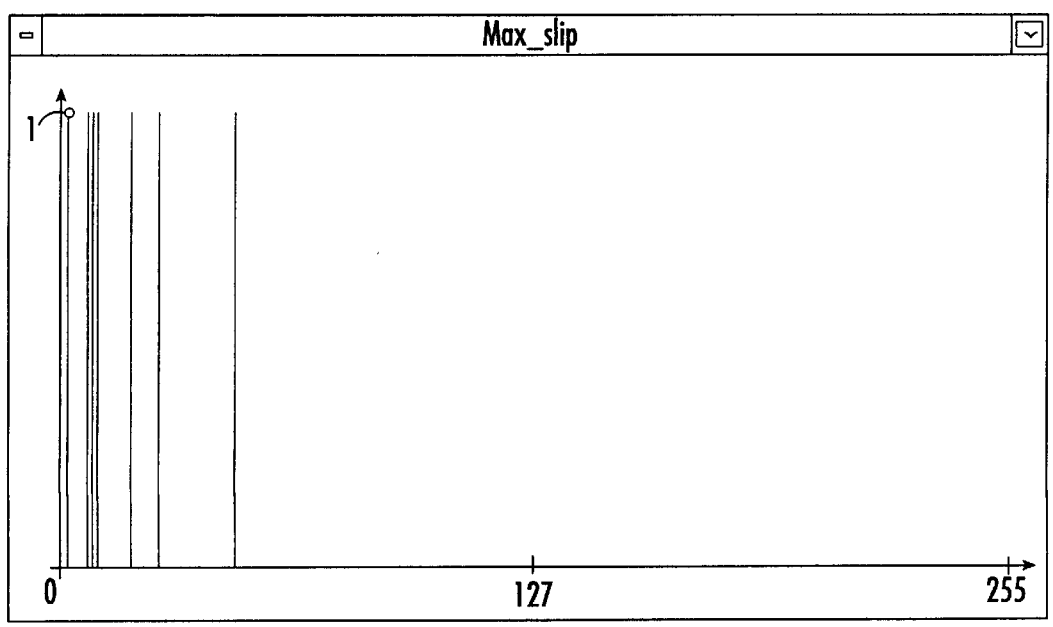
FIG. 9 shows the diagrams of the membership functions of the variable "maximum permitted slip" in a fuzzy logic control system of the invention.

FIGS. 8 and 9 indicate the diagrams of the input and output variables of the fuzzy logic microprocessor.

The fuzzy rules defining the limit values of the slip as a function of the actual speed of the motor are recited in the following table:

---

IF Motor_Speed IS very_low THEN Max_slip IS Very_low
IF Motor_Speed IS low THEN Max_slip IS Low
IF Motor_Speed IS high THEN Max_slip IS High
IF Motor_Speed IS very_high THEN Max_slip IS Very_high

---

The fuzzy rules of control of the modulation index as a function of the slip and of the rotor frequency are recited in the following table:

```
IF (Slip IS Zero OR Slip IS Negative) AND Motor_Speed IS
   Very_low THEN Modulation_index IS Very_low
IF (Slip IS Zero OR Slip IS Negative) AND Motor_Speed IS
   low THEN Modulation_index IS Low
IF (Slip IS Zero OR Slip IS Negative) AND Motor_Speed IS
   high THEN Modulation_index IS High
IF (Slip IS Zero OR Slip IS Negative) AND Motor_Speed IS
   Very_high THEN Modulation_index IS Very_high
IF Slip IS Positive AND Motor_Speed IS Very_low THEN
   Modulation_index IS Very_low
IF Slip IS Positive AND Motor_Speed IS low THEN
   Modulation_index IS Low
IF Slip IS Positive AND Motor_Speed IS high THEN
   Modulation_index IS High
IF Slip IS Positive AND Motor_Speed IS Very_high THEN
   Modulation_index IS Very_high
```

Naturally, in case the fuzzy microprocessor elaborates time-by-time the correct stator frequency value (already updated) expressed in a number of bits adequate for the required degree of definition, there is no need for an adder and an updatable register.

According to an alternative embodiment of the system of the invention, it is possible to eliminate the need for an encoder (sensor) keyed on the motor's axle, to provide for an indication of the instantaneous motor speed, by exploiting the processing capacities of the fuzzy logic processor to calculate the speed of the motor from the phase angle ($\cos\phi$) between the voltage and the driving current flowing through any of the phase-windings of the motor, once the inductance and resistance values of the equivalent electric model of the phase-winding are known. As a matter of fact, the equivalent electrical scheme of a phase-winding of the motor may be as shown in FIG. 7, which highlights how a resistance of the electrical model depends on the actual slip.

Once established, the relationship that exists between the phase difference ($\cos\phi$) between voltage and current and the slip (from which depends the value of one of the resistances of the equivalent electric model of a motor's phase-winding), the fuzzy processor is capable by applying the above equation (1) as a function of the frequency of the stator, to calculate the actual motor speed. In this manner, an essentially sensorless control system may be realized that retains the same performance of a system equipped with an encoder.

Figure 7:
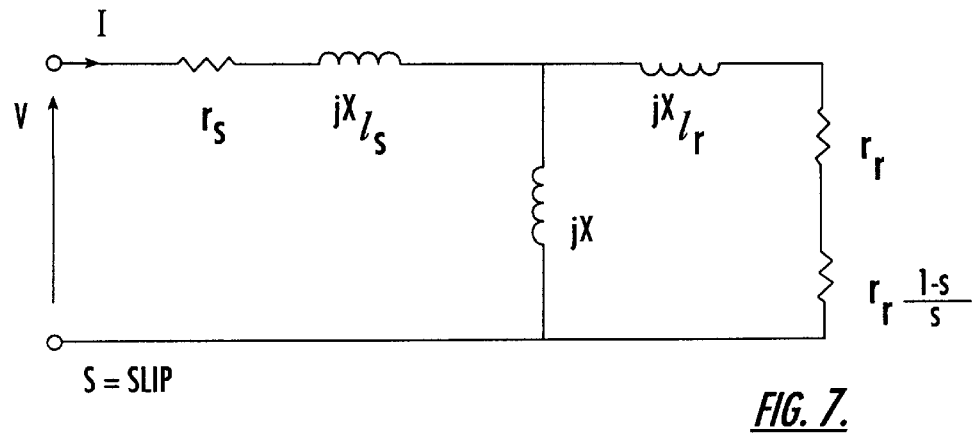
FIG. 7 is the equivalent circuit scheme of a phase-winding of the motor.

In case of a sensorless embodiment, it is evident of the need to provide to the fuzzy processor the values of inductance and resistance of the equivalent electrical model of the motor stator windings to permit the processor to elaborate the relationship between the cost and the slip (upon which depends one of the resistances of the equivalent electric model of FIG. 7). From such a model, by knowing the frequency of stator, the microprocessor is capable of calculating the actual speed of rotation of the motor. Evidently, in an alternative sensorless embodiment as just described, the scheme of FIG. 4 does not require the encoder and the associated blocks of the Divider and Counter, because the rotation speed is calculated by the fuzzy controller.

In the example of the embodiment shown in FIG. 4, the number of pulses per revolution generated by the encoder depends on the ratio between the number of poles of the tachometric sensor keyed on the motor's axle and the number of poles of the motor. In consideration that this ratio may vary, homogeneous measures of the impressed stator frequency and of the rotational speed are provided for by adding in cascade, a divider circuit, preferably equipped with a Schmidt trigger input stage, which, properly programmed according to the characteristics of the motor and of the tachometric sensing, permits obtaining the same digital value for identical stator frequency values. This defines the slip calculation as the difference between the digital value of the stator frequency and that of the rotor.

In cascade to the divider circuit there is a counter that codifies the value in bytes of 8 bits (seven bits plus one sign bit). A first comparator (I°) calculates the difference between the two digital values of reference speed and of the actual instantaneous speed of the motor producing an error datum. A second comparator (II°) calculates the difference between the rotor frequency and the stator frequency producing a slip datum. The fuzzy microprocessor calculates the correction to the value of the stator frequency (in case of an incremental control, otherwise calculates the maximum permitted slip at that speed and the new corrected value of stator frequency), and the correct modulation index. In case of incremental control, the adder and the associated register block update the value of stator frequency and input it to the PWM generator block.

The diagrams of the input and output fuzzy variables used for controlling the slip are shown in FIGS. 8 and 9, respectively.

What is claimed is:

1. A method of controlling pulse width modulation (PWM) driving of a multi-phase motor to limit slip to a maximum percentage of the stator drive frequency, wherein slip is a difference between a stator drive frequency and a rotor frequency corresponding to a rotational speed of the motor, the method comprising the steps of:

inputting to a processor data representative of the rotor frequency, the stator drive frequency, a reference frequency corresponding to a required rotational motor speed, and a torque characteristic as a function of the stator drive frequency; and determining an appropriate value of the stator drive frequency, a PWM modulation index and the maximum percentage value of the slip at a current rotor frequency by a fuzzy logic algorithm implemented in the processor and without using a look-up table of preestablished slip values.

2. A method according to claim 1, further comprising the steps of:

feeding to said processor data representative of electrical parameters of phase-windings of the motor; and calculating by a fuzzy logic algorithm the current rotor frequency corresponding to a current rotational speed of the motor as a function of the electrical parameters and of a power factor ($\cos\phi$).

3. A method according to claim 1, wherein the step of determining an appropriate value of the stator drive frequency comprises determining an appropriate incremental value.

4. A method according to claim 3, further comprising the step of adding the appropriate incremental value to a previous value.

5. A method according to claim 1, wherein the step of determining an appropriate value of the stator drive frequency comprises determining a total new value of the stator drive frequency.

6. A method according to claim 1, wherein the step of inputting data representative of rotor frequency comprises the steps of:

sensing a rotational speed of the rotor; and generating a datum representative of the sensed rotational speed of the rotor.

7. A method according to claim 6, further comprising the step of comparing the datum representative of the sensed rotation speed to datum representative of the reference frequency.

8. A method according to claim 1, wherein the multi-phase motor is a three-phase motor with each phase winding being 120° out of phase from adjacent phase windings.

9. A method of controlling pulse width modulation (PWM) driving of a multi-phase motor to limit slip to a maximum percentage of the stator drive frequency, wherein slip is a difference between a stator drive frequency and a rotor frequency corresponding to a rotational speed of the motor, the method comprising the steps of:

inputting to a processor data representative of the rotor frequency, the stator drive frequency, a reference frequency corresponding to a required rotational motor speed, and a torque characteristic as a function of the stator drive frequency;

feeding to said processor data representative of electrical parameters of phase-windings of the motor;

calculating by a fuzzy logic algorithm implemented in the processor a current rotor frequency corresponding to a current rotational speed of the motor as a function of the electrical parameters and of a power factor ($\cos\phi$); and determining an appropriate value of the stator drive frequency, a PWM modulation index and the maximum percentage value of the slip at the current rotor frequency by a fuzzy logic algorithm implemented in the processor.

10. A method according to claim 9, wherein the step of determining an appropriate value of the stator drive frequency comprises determining an appropriate incremental value.

11. A method according to claim 10, further comprising the step of adding the appropriate incremental value to a previous value.

12. A method according to claim 9, wherein the step of determining an appropriate value of the stator drive frequency comprises determining a total new value of the stator drive frequency.

13. A method according to claim 9, wherein the multi-phase motor is a three-phase motor with each phase winding being 120° out of phase from adjacent phase windings.

14. A driving system for a multi-phase motor of a type comprising a rotor and a stator, the driving system comprising:

a generator circuit for generating pulse width modulation (PWM) drive signals at a certain base stator frequency as a function of digital control data for the stator frequency and for a PWM modulation index, respectively;

a first digital comparator for comparing a first datum representative of a rotational speed of the motor and a second datum representative of a reference speed and for outputting a third error datum;

a second digital comparator for comparing the first datum and the stator frequency and producing a fourth datum representative of slip; and a fuzzy logic processor for processing according to a fuzzy algorithm the third error datum, the fourth datum representative of slip, and the first datum representative of the rotational speed, and for producing a base frequency datum and a PWM modulation index datum.

15. A driving system according to claim 14, further comprising means for generating the first datum.

16. A driving system according to claim 15, wherein said means for generating comprises an encoder.

17. A driving system according to claim 14, wherein said fuzzy logic processor further comprises means for determining the first datum based upon electrical characteristics of phase windings of the multi-phase motor.

18. A driving system according to claim 14, further comprising:

a register containing a current digital base frequency datum; and an adder/subtractor circuit having first inputs through which an adjustment datum produced by said fuzzy logic processor is fed and second inputs through which said base frequency datum stored in said register is fed and output nodes onto which an updated value of said base frequency is produced and fed to said generator circuit and stored in said register.

19. A driving system according to claim 14, wherein the multi-phase motor is a three-phase motor with each phase winding being 120° out of phase from adjacent phase windings.

20. A driving system for controlling pulse width modulation (PWM) driving of a multi-phase motor to limit slip to a maximum percentage of the stator drive frequency, wherein slip is a difference between a stator drive frequency and a rotor frequency corresponding to a rotational speed of the motor, the driving system comprising:

a processor; and input means for inputting to said processor data representative of the rotor frequency, the stator drive frequency, a reference frequency corresponding to a required rotational motor speed, and a torque characteristic as a function of the stator drive frequency;

said processor comprising fuzzy logic means for determining an appropriate value of the stator drive frequency, a PWM modulation index and the maximum percentage value of the slip at a current rotor frequency by a fuzzy logic algorithm.

21. A driving system according to claim 20, further comprising:

means for feeding to s aid processor data representative of electrical parameters of phase-windings of the motor; and means for calculating by a fuzzy logic algorithm the current rotor frequency corresponding to a current rotational speed of the motor as a function of the electrical parameters and of a power factor ($\cos\phi$).

22. A driving system according to claim 20, wherein said fuzzy logic means comprises means for determining an appropriate incremental value of the stator drive frequency.

23. A driving system according to claim 22, further comprising adder means for adding the appropriate incremental value to a previous value.

24. A driving system according to claim 20, wherein said fuzzy logic means comprises means for determining a total new value of the stator drive frequency.

25. A driving system according to claim 20, wherein said input means comprises:

sensing means for sensing a rotational speed of the rotor; and generating means for generating a datum representative of the sensed rotational speed of the rotor.

26. A driving system according to claim 25, further comprising means for comparing the datum representative of the sensed rotation speed to datum representative of the reference frequency.

27. A driving system according to claim 20, wherein the multi-phase motor is a three-phase motor with each phase winding being 120° out of phase from adjacent phase windings.

* * * * *

UNITED STATES PATENT AND TRADEMARK OFFICE
CERTIFICATE OF CORRECTION

PATENT NO. : 6,075,338
DATED : June 13, 2000
INVENTOR(S) : Ettore Mazza, Biagio Russo, Jean-Marie Bourgeois It is certified that error appears in the above-identified patent and that said Letters Patent is hereby corrected as shown below:

[30] Foreign Application Priority Data

Delete: "Aug. 6, 1997 [IT] Italy ............................VA97A0001"
Insert -- Jan. 13, 1997 [IT] Italy ............................VA97A0001 --

In the Specification

Column 3, Line 11
Delete: "adder/subtractor-therefor"
Insert -- adder/subtractor --

Column 5, Line 28
Delete: "(cosφ)"
Insert -- cosφ --

Column 5, Line 37
Delete: "(cosφ)"
Insert -- cosφ --

Column 6, Line 50
Delete: "(cosφ)"
Insert -- cosφ --

Signed and Sealed this

Twenty-fourth Day of April, 2001

Attest:

NICHOLAS P. GODICI

*Attesting Officer*   *Acting Director of the United States Patent and Trademark Office*